United States Patent [19]

Jurisch et al.

[11] Patent Number: 6,046,895
[45] Date of Patent: Apr. 4, 2000

[54] DISTANCE PROTECTION METHOD

[75] Inventors: Andreas Jurisch, Berlin, Germany; Tevfik Sezi, Raleigh, N.C.

[73] Assignee: Siemens AG, Munich, Germany

[21] Appl. No.: 09/117,595

[22] PCT Filed: Jan. 24, 1997

[86] PCT No.: PCT/DE97/00162

§ 371 Date: Dec. 1, 1998

§ 102(e) Date: Dec. 1, 1998

[87] PCT Pub. No.: WO97/28594

PCT Pub. Date: Aug. 7, 1997

[30] Foreign Application Priority Data

Jan. 31, 1996 [DE] Germany .............. 196 05 025

[51] Int. Cl.⁷ .................................................. H02H 3/18
[52] U.S. Cl. ........................................... 361/79; 361/80
[58] Field of Search ................................. 361/79, 80

[56] References Cited

U.S. PATENT DOCUMENTS

| | | | |
|---|---|---|---|
| 4,296,541 | 10/1981 | Wilkinson | 361/80 |
| 4,321,681 | 3/1982 | Sackin et al. | 364/492 |
| 4,706,156 | 11/1987 | Caunce | 361/80 |
| 4,821,137 | 4/1989 | Wilkinson | 361/80 |
| 5,325,061 | 6/1994 | Schweitzer, III | 324/522 |
| 5,367,426 | 11/1994 | Schwetzer, III | 361/80 |

FOREIGN PATENT DOCUMENTS

| | | |
|---|---|---|
| 0 284 546 | 9/1988 | European Pat. Off. . |
| WO 80/02748 | 12/1980 | WIPO . |

OTHER PUBLICATIONS

H. Clemenz et al., "Relaisschutztechnik in Elektroenergiesystemen", VEB Verlag Technik, Berlin, 1980, pp. 64–71.*

R. Roeper, "Kurzschlußströme in Drehstromnetzen, zeitlicher Verlauf und Berechnung der Größen", 6th Edition, Berlin/Munich, Siemens Aktiengesellschaft, 1984, pp. 48–53.

Ziegler, "Mehrsystemiger Distanzschultz für Höchstspannungsnetze", Siemens–Energietechnik, (1979), pp. 153–156.**

"Distanzschutzeinrichtung", PD551, AEG, 1991, pp. III/33–39.*

*Primary Examiner*—Michael J. Sherry
*Attorney, Agent, or Firm*—Kenyon & Kenyon

[57] ABSTRACT

Impedance protection method for detecting short-circuits on a monitored section of an electrical power supply line in which impedance values formed by current and voltage during a short-circuit in order to extract a tripping signal are checked to see whether they lie within a specific tripping characteristic. A relatively small first tripping characteristic in relation to the monitored section is used, and impedance values first determined are compared to this first tripping characteristic to see whether they lie inside or outside this tripping characteristic; the tripping signal is generated if the impedance values lie within the characteristic and, if not, the system switches to a maximum tripping characteristic corresponding to the monitored section. Impedance values following the impedance values first determined are checked to see whether they lie within the maximum tripping characteristic and, if they do, the tripping signal is generated. More than two tripping characteristics can be used, with each tripping characteristic being larger than the tripping characteristic directly preceding it, but smaller than the maximum tripping characteristic.

12 Claims, 4 Drawing Sheets

DISTANCE PROTECTION METHOD

FIELD OF THE INVENTION

The present invention relates to an impedance protection method for detecting short-circuits on a monitored section of an electrical power supply line in which impedance values formed from current and voltage during a short-circuit are checked to see whether they lie within a specific tripping characteristic in order to extract a tripping signal.

BACKGROUND INFORMATION

A method for detecting short circuits is described in a book entitled "Relaisschutztechnik in Elektroenergiesystemen"(Protection in Electrical Power Systems), Dr.-Ing. Heinz Clemenz, Dr.-Ing. Klaus Rothe, VEB Verlag Technik, Berlin, 1980, pages 64 through 66. In this conventional method, the absolute impedance value formed from current and voltage during a short-circuit is checked to see whether it lies within a circle with a center point defined by the start of the monitored section of a power supply line. The circle radius is determined by the size of the monitored section. Although this method may generate the tripping signal relatively quickly, it has a disadvantage in that the circular tripping characteristic adapts poorly to the conditions of an electrical power supply line; if an unfavorable value is selected for the circle radius, for example a value that encompasses all possible short-circuit faults on the monitored line section, the circular tripping characteristic may also include impedance values that cannot be attributed to a short-circuit fault but which occur under certain load conditions. On the other hand, selecting a circle radius so small that the circle cannot produce false tripping means that some of the short-circuit faults may not be detected. The conventional method therefore achieves a relatively high tripping speed, but is able to detect only some of the short-circuit faults that can occur.

A further impedance protection method is described in the operating instructions of the PD 551 impedance protection device manufactured by AEG, pages III/29 ff. This method uses a polygonal tripping characteristic. The resistance and reactance components of these impedance values are checked to see whether they lie within this polygon. The method requires a relatively large amount of time in order to form a tripping signal, since the data window needed for calculating the resistance and reactance components must be relatively large. On the other hand, the polygonal method detects a larger number of the possible short-circuit faults than does the method using the circle, since the polygonal characteristic can be better adapted to the conditions of the power supply line.

SUMMARY OF THE INVENTION

The object of the present invention is to provide an impedance protection method that detects all short-circuit faults that may occur on a monitored line section and, if necessary, to form a tripping signal, at the same time reducing the time needed to generate the tripping signal compared to the known methods.

This object is achieved with an impedance protection method according to the present invention:

by using a relatively small first tripping characteristic in relation to the monitored section of a power supply line and comparing the impedance values first determined to this first tripping characteristic to see whether they lie inside or outside this tripping characteristic;

by generating the tripping signal if the impedance values first determined lie within the first tripping characteristic;

by switching to a maximum tripping characteristic that corresponds to the monitored section if the impedance values first determined lie outside this tripping characteristic;

and by checking the impedance values following the impedance values first determined to see whether they lie within the maximum tripping characteristic and generating the tripping signal, if necessary.

The use of a relatively small tripping characteristic as the first tripping characteristic initially provides relatively limited protection for the monitored section, since it does not detect all of the faults occurring on this section. Nevertheless, approximately 80% of the short-circuits can be detected within an advantageously short period of time because only relatively few measured current and voltage values need be used to form the impedance values, due to the imprecision tolerance. If the occurring fault could not be detected with the relatively small tripping characteristic, the system switches to a maximum tripping characteristic, which can be used to detect all faults that occur on the monitored section. The method according to the present invention therefore guarantees that all occurring faults result in the formation of a tripping signal within an optimally short period of time without producing any unwanted false tripping.

Another embodiment of the method according to the present invention includes the steps of switching to a second tripping characteristic that is slightly larger than the first tripping characteristic but smaller than the maximum characteristic if the impedance values first determined lie outside the first tripping characteristic;

checking the further impedance values following the impedance values first determined to see whether they lie within or outside this second tripping characteristic;

generating the tripping signal if the further impedance values lie within the second tripping characteristic;

switching to at least one additional tripping characteristic that is larger than the second tripping characteristic but smaller than the maximum tripping characteristic if the further impedance values lie outside the second tripping characteristic;

checking the additional impedance values following the further impedance values to see whether they lie within this additional tripping characteristic;

generating the tripping signal if the additional impedance values lie within this additional tripping characteristic;

and switching to the maximum tripping characteristic if the additional impedance values lie outside this additional tripping characteristic.

Switching from the first to the second tripping characteristic still does not result in detecting all occurring faults as is the case when using the maximum tripping characteristic. However, with the use of the second tripping characteristic, it does allow many of the faults to be detected that could not be detected with the first tripping characteristic. For the above reason, a tripping signal may be advantageously generated more quickly than when detecting the faults directly with the maximum tripping characteristic and without using the second tripping characteristic because the analysis of the maximum tripping characteristic is relatively or comparatively more time-consuming. The same is true when switching from the second tripping characteristic to the additional tripping characteristic with the method according to the present invention. The method according to the present invention can use more than three tripping characteristics, with each tripping characteristic always being larger than the tripping characteristic directly preceding it but smaller than the maximum tripping characteristic.

In another advantageous embodiment of the present invention, a circle with a center point, which is defined by the start of the monitored section of a power supply line, is used as the first tripping characteristic. The advantage of using the circle is that the circle is the fastest way to detect obvious faults because the determination of a single impedance component, namely its absolute value, is sufficient in order to check this impedance with reference to the circle.

Another embodiment of the method according to the present invention provides for using, as the first tripping characteristic, a circle cut symmetrically and parallel to the reactance axis with a center point that is defined by the start of the monitored section of a power supply line;

and checking the impedance values first determined to see whether their absolute value and their resistance component lie within the first tripping characteristic.

The shape of this first tripping characteristic makes it possible to detect even less obvious faults than with the circular tripping characteristic. However, determining the impedance values for a tripping characteristic in the shape of a cut circle takes more time because, after all, two impedance components must be determined in this case.

Another embodiment of the method according to the present invention includes the steps of using, as the second tripping characteristic, a circle cut symmetrically and parallel to the reactance axis with a center point that is defined by the start of the monitored section of a power supply line;

and checking the further impedance values to see whether their absolute values and their resistance components lie within this tripping characteristic.

The use of the first characteristic, which provides the fastest fault detection, is followed by the use of a slightly larger characteristic. This larger characteristic advantageously makes it possible to detect a larger number of faults, albeit over a longer period of time.

When designing the method according to the present invention with at least one tripping characteristic in the form of a cut circle, the resistance component of the impedance is advantageously extracted by measuring the instantaneous values of current and voltage during at least one half a system oscillation period of the electrical power supply line;

calculating the instantaneous values of power from the instantaneous values of current and voltage and determining a value proportional to the effective power through integration;

squaring the instantaneous values of current and determining the integral of the squared instantaneous values of current;

and generating the resistance component of impedance from the value proportional to the effective power and the value of the integral of the squared current through quotient formation.

The advantage of this extraction method lies in its speed. This speed results from the relatively small number of instantaneous values of current and voltage needed to extract the resistance component.

The absolute value of the impedance can also be determined from the relatively small number of instantaneous values.

The present invention advantageously achieves this by digitizing the instantaneous values of the individual conductor currents and the ground current as well as the instantaneous values of the voltages between two conductors and between one conductor and ground and weighting them in a digital filter unit composed of at least one linear-phase non-recursive digital filter (FIR filter) of a first type and at least one linear-phase non-recursive digital filter (FIR filter) of a second type;

weighting instantaneous values with the digital filters of the first and second type, thereby producing a phase rotation so that the instantaneous values weighted by the digital filters of the first type and the instantaneous values weighted by the digital filters of the second type have an orthogonal relationship to one another;

and determining the impedance values from the weighted instantaneous values through quotient formation by determining real and imaginary components of the amplitudes of current and voltage for phase-to-phase and phase-to-ground loops.

The advantage of this procedure according to the present invention lies in the relatively short amount of time needed to form the absolute impedance value.

In carrying out the impedance protection method according to the present invention, it is advantageous for reasons of fault strategy to select only clearly faulty phase-to-phase or phase-to-ground loops before performing the actual distance measurement and then to compare the impedance values of these loops to the first or possibly the second tripping characteristic. A loop is not clearly faulty, for example, if the current changes as a result of an arc. This type of not clearly faulty loop is examined to determine its impedance values only after using the first or possibly the second tripping characteristic. In some cases, the cause of the unclear fault, for example the arc, disappears relatively quickly and therefore does not form the tripping signal during later measurements.

In an advantageous embodiment of the impedance protection method according to, the present invention selects such clearly faulty loops provides that, before comparing the impedance values to the first or possibly second tripping characteristic, it is determined for a three-phase power supply line whether, during activation, a phase-to-ground or phase-to-phase loops was activated;

or a phase-to-phase loop and simultaneously a loop between one of the conductors in the phase-to-phase loop and ground were activated;

or all phase-to-phase loops were activated;

or all phase-to-phase and phase-to-ground loops were activated;

and the instantaneous values of current and voltage of the detected loops are used to form the impedance values.

In an embodiment of the impedance protection method according to the present invention, the use of a polygonal tripping characteristic is advantageously used for at least one of the characteristics following the second tripping characteristic. The polygonal tripping characteristic in this case has an advantage in that its shape can be selected so that it comparatively selectively detects the faults occurring in the monitored section.

The use of a polygonal tripping characteristic as the maximum tripping characteristic is also advantageous.

When using a polygonal tripping characteristic, it is preferable to use the resistance and reactance components of impedance to check the impedance values. The reactance component can be approximated by the inductance component. As a result, it is advantageous to instantaneous values of current and voltage in order to compare the impedance values to the polygonal tripping characteristics and to weight them in a digital filter arrangement composed of two linear-phase non-recursive digital filters (FIR filters) of a first type (with weighting factor hi) and a digital filter of a second type (with weighting factor $g_i$);

freely specify the individual weighting factors ($h_i$, $g_i$) of the FIR filters;

correct an error occurring during analysis by a correction factor ($k_c$) formed as a quotient from the amplitude-log frequency curves of the nominal frequency ($H(\Omega_0)$, $G(\Omega_0)$) of the FIR filters of the first and second type;

and determine the resistance and inductance components of impedance from the corrected, weighted instantaneous values.

The advantage of this embodiment of the impedance protection method lies in the fact that the resistance and inductance values can be determined relatively accurately and quickly.

If more instantaneous values of current and voltage are available over time, the accuracy of the determined values can be improved by increasing the number of weighting factors. The present invention achieves this by providing the linear-phase non-recursive digital filters (FIR filters) with n+1 weighting factors each, where n is an integer;

and using a value for n that is smaller when checking the impedance values on the basis of the broader polygonal tripping characteristic than when checking the impedance values on the basis of the maximum tripping characteristic.

DETAILED DESCRIPTION

Figure 1:
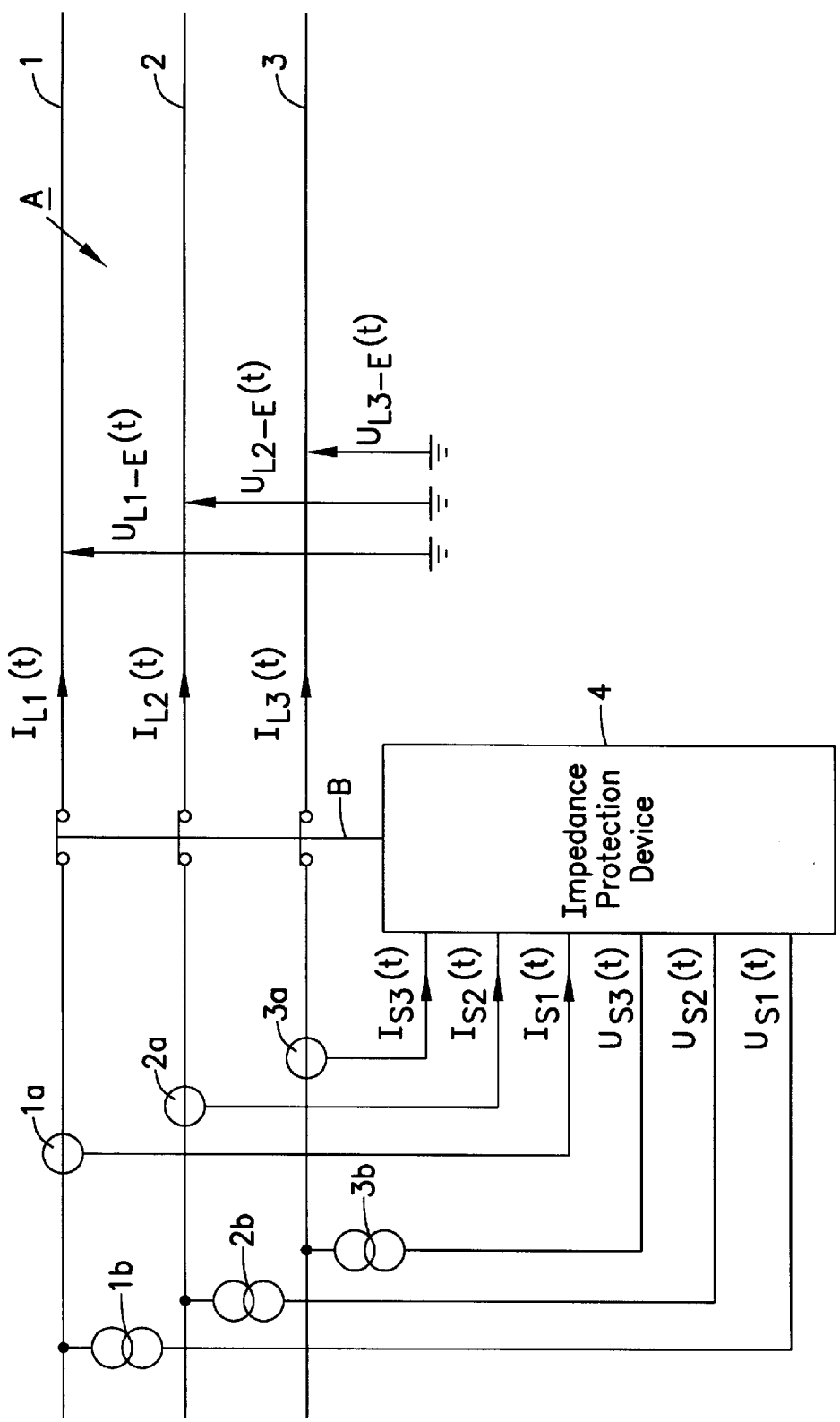
FIG. 1 shows a schematic drawing of a section of an electrical power supply line to be monitored containing three conductors, as well as an arrangement for carrying out the method according to the present invention at one point on the section.

FIG. 1 shows a schematic drawing of a section A of an electrical power supply line composed of three conductors 1, 2 and 3. Alternating currents $I_{L1}(t)$, $I_{L2}(t)$, and $I_{L3}(t)$, which are converted to secondary currents $I_{S1}(t)$, $I_{S2}(t)$, and $I_{S3}(t)$ in current transformers 1a, 2a, and 3a, flow though these conductors. Alternating voltages $U_{L1-E}(t)$, $U_{L2-E}(t)$, and $Q_{L3-E}(t)$ between each conductor 1, 2, 3 and ground are tapped by voltage transformers 1b, 2b, and 3b, and converted to secondary voltages $U_{S1}(t)$, $U_{S2}(t)$, and $U_{S3}(t)$. Secondary currents $I_{S1}(t)$, $I_{S2}(t)$, and $I_{S3}(t)$ and secondary voltages $U_{S1}(t)$, $U_{S2}(t)$, and $U_{S3}(t)$ are sampled and stored in an arrangement for carrying out impedance protection method 4 (impedance protection device) at sampling intervals of 1 ms, for example. A secondary ground current $I_{SE}(t)$ is sampled and stored or calculated, depending on the design of the power supply line. The instantaneous values of the secondary currents and voltages sampled and stored in this manner are used to determine the impedance values.

Figure 2:
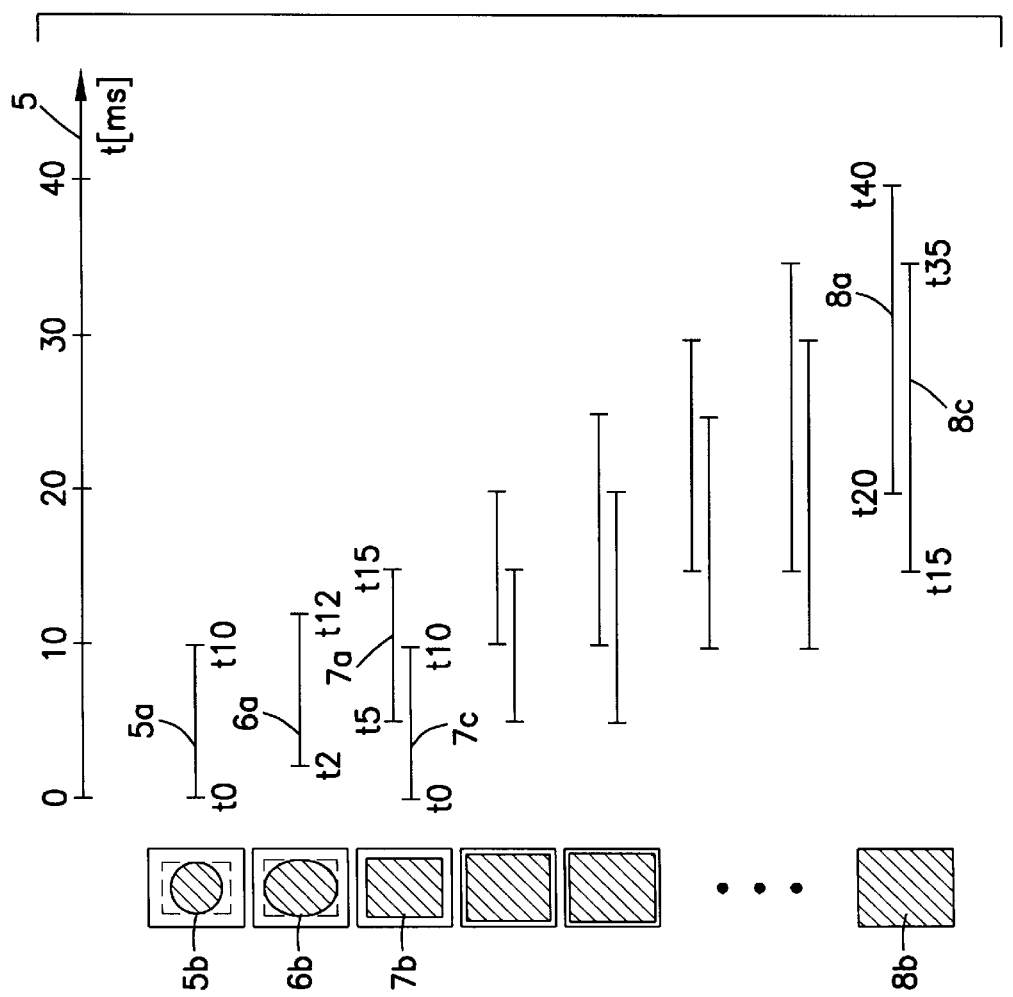
FIG. 2 shows a time curve of the impedance protection method illustrated.

As shown in FIG. 2, the time that elapses after the occurrence of an irregularity on the monitored section is entered in ms on time axis 5. The secondary current to be analyzed in order to determine the fault and the corresponding secondary voltage are first sampled and stored at a time interval of $t_0=0$ ms to $t_{10}=10$ ms, for example, (represented by bar 5a). Impedance value $|Z_S(t_{10})|$ is derived from the stored values. This value $|Z_S(t_{10})|$ is checked to see whether it lies inside or outside a first tripping characteristic 5b, which is represented by a circle. If first impedance value determined $|Z_S(t_{10})|$ lies within tripping characteristic 5b, a tripping signal is generated in order to trip a circuit-breaker B.

If first impedance value determined $|Z_S(t_{10})|$ lies outside tripping characteristic 5b, a tripping signal is not sent to circuit-breaker B.

This method for determining and checking impedance values is usually carried out not only for secondary currents and voltages of a conductor loop, but also for secondary currents and voltages of other conductor loops that have been formed and therefore activated by short-circuits, depending on the activation of impedance protection device 4.

If the first impedance values determined all lie outside tripping characteristic 5b, a second tripping characteristic 6b in the form of a circle cut symmetrically and parallel to reactance axis X (cf. FIG. 3) is used. Secondary currents and voltages of a faulty loop sampled and stored during further time interval 6a lasting for example $t_2=2$ ms to $t_{12}=12$ ms are used to determine a further impedance value $Z_S(t_{12})$, which is characterized by its absolute value $|Z_S(t_{12})|$ and its resistance component $Z_{SR}(t_{12})$. This further impedance value is checked to see whether it lies inside or outside second tripping characteristic 6b. If it lies within the characteristic, a tripping signal is generated. If not, no tripping signal is formed, and instead the system switches to an additional tripping characteristic 7b.

Additional tripping characteristic 7b is a polygon. The secondary current and the corresponding secondary voltage used to detect the fault are sampled and stored at additional time interval 7a ($t_5=5$ ms to $t_{15}=15$ ms) and at time interval 7c ($t_0=0$ ms to $t_{10}=10$ ms), which is identical to interval 5a; the stored values are used to determine an additional impedance value $Z_S(t_{15})$, which is characterized by its resistance component $Z_{SR}(t_{15})$ and its inductance component ($Z_{SL}(t_{15})$). This additional impedance value is checked to see whether it lies within or outside additional tripping characteristic 7b. According to the method described in the example, a total of eight tripping characteristics are used. When using a maximum tripping characteristic 8b, which corresponds to the monitored section, the secondary current and the corresponding secondary voltage used to detect the fault are sampled and stored at time intervals 8a ($t_{20}=20$ ms to $t_{40}=40$ ms) and 8c ($t_{15}=15$ ms to $t_{35}=35$ ms)

Figure 3:
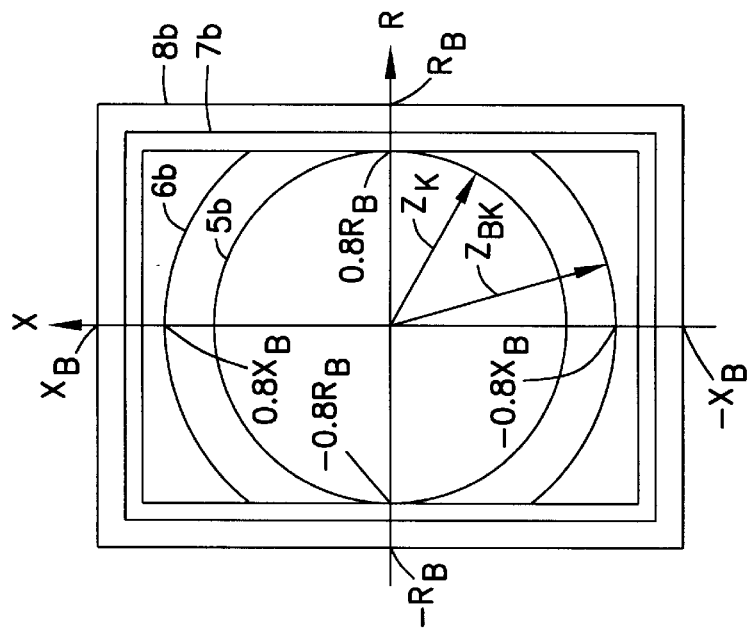
FIG. 3 shows a tripping characteristic illustrated on an impedance plane.

FIG. 3 shows tripping characteristics 5b, 6b, 7b, and 8b, which are illustrated on an impedance plane with a resistance axis R and a reactance axis X and are used in the impedance protection method described in the example. The intersection of the two coordinate axes designates a beginning of power supply line section A to be monitored. Maximum tripping characteristic 8b is a rectangular polygon with maximum values of resistance ($-R_B$, $+R_B$) and reactance ($-X_B$, $+X_B$). Conversely, first tripping characteristic 5b is relatively small and has a radius of $Z_K=0.8 \times MIN(R_B, X_B)$, where $MIN(R_B, X_B)$ represents the smaller of the two values of $R_B$ and $X_B$. The circle cut symmetrically and parallel to reactance axis X at points $0.8 \times R_B$ and $0.8 \times (-RB)$ with a radius of $Z_{BK}=0.8 \times X_B$ is used as second tripping characteristic 6b. Tripping characteristic 7b lies between characteristics 6b and 8b. Additional polygons, which are not illustrated, are also used in the example. These additional polygons are larger than polygon 7b, but smaller than maximum tripping characteristic 8b.

In carrying out the method according to the present invention using tripping characteristic 5b, absolute impedance value $|Z_S|$ must be determined as the impedance value. It is derived from the squares of corresponding voltage amplitude $\hat{U}_{loop}$ and corresponding current amplitude $\hat{I}_{loop}$ for an activated loop.

Figure 4:
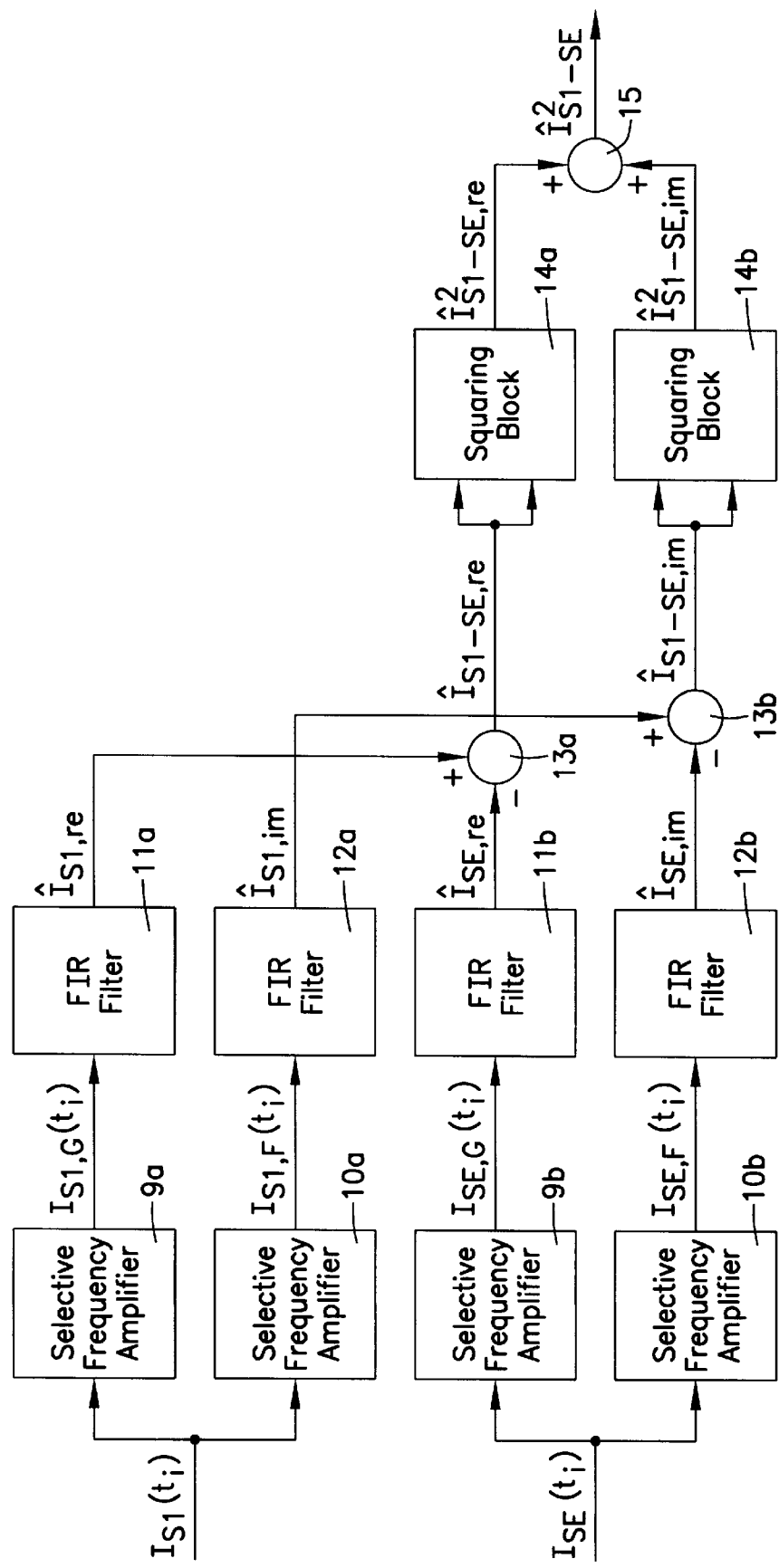
FIG. 4 shows a procedure based on a simplified block diagram to determine the square of a loop current amplitude.

The squares of the current amplitudes are formed according to a block diagram illustrated in FIG. 4. The formation of the square of amplitude $\hat{I}_{S1-SE}$ of a current in a phase-to-ground loop composed of conductor 1 and ground is illustrated in the example. Sampled instantaneous values $I_{S1}(t_i)$ and $I_{SE}(t_i)$ of secondary current $I_{S1}$ and $I_{SE}$ are each amplified and normalized to $I_{S1,G}(t_i)$ and $I_{SE,G}(ti)$ in selective-frequency signal amplifiers 9a and 9b and to $\hat{I}_{S1,F}(t_i)$ and $I_{SE,F}(t_i)$ in selective-frequency amplifiers 10a and 10b. The amplified and normalized signals are subsequently weighted in linear-phase non-recursive digital filters (FIR filters) of a first type (G) 11a and 11b and of a second type (F) 12a and 12b. FIR filters 11a, 11b, 12a, and 12b each have 11 coefficients ($g_0, g_1, \ldots, g_{10}$ for 11a and 11b and $f_0, f_1, \ldots, f_{10}$ for 12a and 12b)

The weightings are the results of discrete convolutions of the coefficients of FIR filters 11a, 11b, 12a, and 12b using the values of the amplified and normalized signals. The following weightings are obtained for $I_{S1,G}(t_i)$ and $I_{S1,F}(t_i)$ at the output of G filter 11a:

$$\hat{I}_{S1,re}(t_n) = G * I_{S1,G}(t_n)$$

$$= \sum_{k=0}^{10} g_k \cdot I_{S1,G}(t_{n-k})$$

and at the output of F filter 12a:

$$\hat{I}_{S1,im}(t_n) = F * I_{S1,F}(t_n)$$

$$= \sum_{k=0}^{10} f_k \cdot I_{S1,F}(t_{n-k})$$

$\hat{I}_{S1,re}(t_n)$ and $\hat{I}_{S1,im}(t_n)$ are the real and imaginary components of the current amplitude in conductor 1 determined at time $t_n$. The coefficients of FIR filters 11a, 11b, 12a, and 12b are, in fact, chosen so that the weighted signals will have phases with an orthogonal relationship to one another.

The calculations for $I_{S1,G}(t_i)$ and $I_{S1,F}(t_i)$ also apply to $I_{SE,G}(ti)$ and $I_{SE,F}(t_i)$ at the output of G filter 11b:

$$\hat{I}_{S1,re}(t_n) = G * I_{SE,G}(t_n)$$

$$= \sum_{k=0}^{10} g_k \cdot I_{SE,G}(t_{n-k})$$

and at the output of F filter 12b:

$$\hat{I}_{SE,im}(t_n) = F * I_{SE,F}(t_n)$$

$$= \sum_{k=0}^{10} f_k \cdot I_{SE,F}(t_{n-k})$$

The weighted signals are subsequently used for forming the real and imaginary components of the loop current amplitude in differential forming blocks 13a and 13b according to the following rule:

$$\hat{I}_{S1-SE,re}(t_n) = \hat{I}_{S1,re}(t_n) - Z_e \cdot \hat{I}_{SE,re}(t_n)$$

$$\hat{I}_{S1-SE,im}(t_n) = \hat{I}_{S1,im}(t_n) - Z_e \cdot \hat{I}_{SE,im}(t_n)$$

Factor $Z_e$ takes into account the ratio of zero-phase-sequence impedance to positive-phase-sequence impedance according to the theory of symmetrical components (Roeper, Richard, "Kurzschlußströme in Drehstromnetzen, zeitlicher Verlauf und Berechnung der Größen"(Short-Circuit Currents in Three-Phase Networks: Time Curves and Variable Calculations), 6th Edition, Berlin/Munich, Siemens Aktiengesellschaft, 1984, pages 48 ff). The factor is calculated by the following formula:

$$Z_e = \sqrt{\frac{\left(1 + \frac{X_E}{X_L}\right)\tan(\varphi_L)^2 + \left(1 + \frac{R_E}{R_L}\right)^2}{\tan^2(\varphi_L) + 1}} - 1$$

where parameters $X_E$, $X_L$, $R_E$, $R_L$ are the reactance and resistance of zero-phase-sequence system (E) or positive-phase-sequence system (L), and 100 L is the phase angle between the positive-phase-sequence impedance and the resistance axis.

The square of the current amplitude of the L1–E phase-to-ground loop is subsequently formed in a summation block 15 from a sum of output signals from squaring blocks 14a and 14b.

$$\hat{I}^2_{S1-SE}(t_n) = \hat{I}^2_{S1-SE,re}(t_n) + \hat{I}^2_{S1-SE,im}(t_n)$$

Parameter $t_n$ stands for time $t_n$ for determining the current amplitude square.

Figure 5:
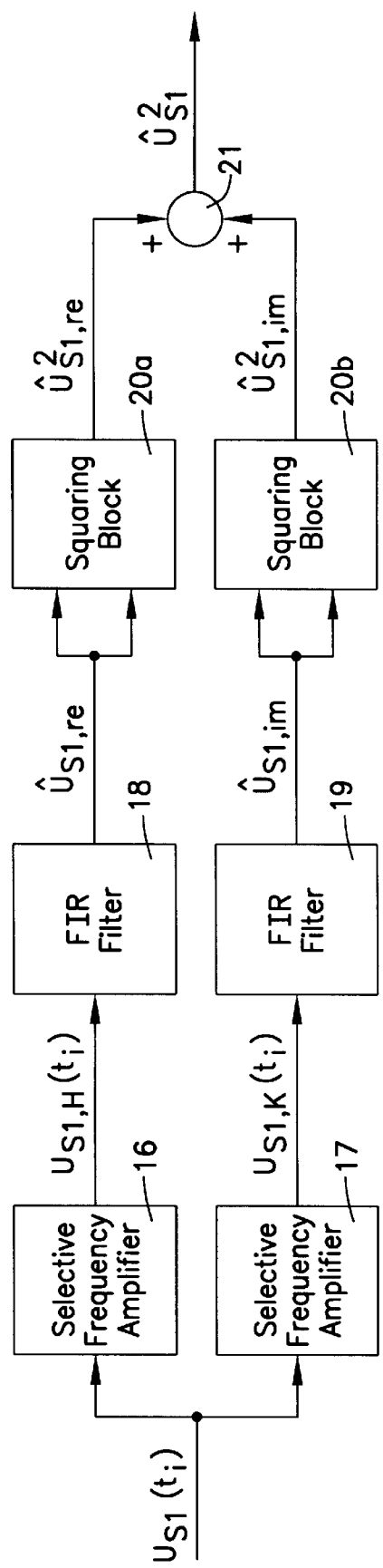
FIG. 5 shows a simplified block diagram for obtaining the square of a loop voltage amplitude.

FIG. 5 shows a block diagram for calculating the square of the secondary voltage amplitude between conductor 1 and ground as an example of a voltage amplitude calculation. In this block diagram, sampled instantaneous values $U_{S1}(ti)$ of secondary voltages $U_{S1}$ are amplified and normalized in selective-frequency amplifiers 16 and 17. This results in signals $U_{S1,H}(t_i)$ and $U_{S1,K}(t_i)$. After being weighted in linear-phase non-recursive digital filters (FIR filters) of a first type (H) 18 and of a second type (K) 19, each of which has coefficients $h_1, h_2 \ldots$ and $k_1, k_2 \ldots$ , real and imaginary components $\hat{U}_{S1,re}(t_n)$ and $\hat{U}_{S1,im}(t_n)$ of the secondary voltage amplitude are obtained in the conductor 1-to-ground loop. The number of coefficients of filters 18 and 19 can be smaller than the number of coefficients of filters 11a, 11b, 12a, and 12b in order to selectively produce a sub-function of the method for measuring voltage in the case of faults. The weighting function using filters 18 and 19 shows:

$\hat{U}_{S1,re}(t_n) = H^* U_{S1,H}(t_n)$ and $\hat{U}_{S1,im}(t_n) = K^* U_{S1,K}(t_n)$ These real and imaginary components are squared in squaring blocks 20a and 20b and summed up in summation block 21, forming the secondary voltage amplitude square.

$\hat{U}^2_{S1}(t_n) = \hat{U}^2_{S1,re}(t_n) + \hat{U}^2_{S1,im}(t_n)$.

The following table contains the formation rules for the loop-specific current and voltage amplitudes.

| Phase-to-ground or phase-to-phase loop | Secondary current amplitude (real and imaginary components) | Secondary voltage amplitude (real and imaginary components) |
| --- | --- | --- |
| L1-E | $\hat{I}_{S1-SE,re} = G^*\hat{I}_{S1,G} - Z_e \cdot G^* \hat{I}_{SE,G}$ <br> $\hat{I}_{S1-SE,im} = F^*\hat{I}_{S1,F} - Z_e \cdot F^* \hat{I}_{SE,F}$ | $\hat{U}_{S1,re} = H^*U_{S1,H}$ <br> $\hat{U}_{S1,re} = K^*U_{S1,K}$ |
| L2-E | $\hat{I}_{S2-SE,re} = G^*\hat{I}_{S2,G} - Z_e \cdot G^* \hat{I}_{SE,G}$ <br> $\hat{I}_{S2-SE,im} = F^*\hat{I}_{S2,F} - Z_e \cdot F^* \hat{I}_{SE,F}$ | $\hat{U}_{S2,re} = H^*U_{S2,H}$ <br> $\hat{U}_{S2,re} = K^*U_{S2,K}$ |
| L3-E | $\hat{I}_{S3-SE,re} = G^*\hat{I}_{S3,G} - Z_e \cdot G^* \hat{I}_{SE,G}$ <br> $\hat{I}_{S3-SE,im} = F^*\hat{I}_{S3,F} - Z_e \cdot F^* \hat{I}_{SE,F}$ | $\hat{U}_{S3,re} = H^*U_{S3,H}$ <br> $\hat{U}_{S3,re} = K^*U_{S3,K}$ |
| L1-L2 | $\hat{I}_{S1-S2,re} = G^*\hat{I}_{S1,G} - G^*\hat{I}_{S2,G}$ <br> $\hat{I}_{S1-S2,im} = F^*\hat{I}_{S1,F} - F^*\hat{I}_{S2,F}$ | $\hat{U}_{S1-S2,re} = H^*U_{S1,H} - H^*U_{S2,H}$ <br> $\hat{U}_{S1-S2,im} = K^*U_{S1,K} - K^*U_{S2,K}$ |
| L2-L3 | $\hat{I}_{S2-S3,re} = G^*\hat{I}_{S2,G} - G^*\hat{I}_{S3,G}$ <br> $\hat{I}_{S2-S3,im} = F^*\hat{I}_{S2,F} - F^*\hat{I}_{S3,F}$ | $\hat{U}_{S2-S3,re} = H^*U_{S2,H} - H^*U_{S3,H}$ <br> $\hat{U}_{S2-S3,im} = K^*U_{S2,K} - K^*U_{S3,K}$ |
| L3-L1 | $\hat{I}_{S3-S1,re} = G^*\hat{I}_{S3,G} - G^*\hat{I}_{S1,G}$ <br> $\hat{I}_{S3-S1,im} = F^*\hat{I}_{S3,F} - F^*\hat{I}_{S1,F}$ | $\hat{U}_{S3-S1,re} = H^*U_{S3,H} - H^*U_{S1,H}$ <br> $\hat{U}_{S3-S1,im} = K^*U_{S3,K} - K^*U_{S1,K}$ |

The amplitudes shown in the table are, of course, calculated at time $t_n$ at which the impedance values are to be determined.

The first column in the table contains the loop for which the current and voltage amplitudes are to be calculated. For example, L1–E designates a loop formed by conductor 1 and ground.

The second column shows the rules for forming the real and imaginary components of current amplitude.

The third column in the table shows the rules for forming the real and imaginary components of voltage amplitude.

The square of the absolute impedance value can now be formed for each loop from the squares of the current and voltage amplitudes of the loop in question and compared to the square of balance point impedance $Z_K$, which corresponds to the circle radius. The absolute impedance value is formed, for example, as follows for the L1–E loop:

$$|Z_{L1-E}(t_n)|^2 = \frac{\hat{U}^2_{S1}(t_n)}{\hat{I}^2_{S1-SE}(t_n)}$$

Checking the absolute impedance value to see whether it lies within the circle can be advantageously carried out with the following comparison even without directly forming this absolute impedance value:

$\hat{U}^2_{loop} \leq Z^2_K \cdot \hat{I}^2_{loop}$

The square of the voltage amplitude in the loop is designated the holding component, and the square of the current amplitude in the loop, multiplied by the squared absolute value of balance point impedance $Z_K$, is designated the tripping component.

When using the circle cut symmetrically and parallel to the reactance axis, the absolute impedance value and the resistance component of the impedance are checked to see whether they lie within the tripping characteristic.

The absolute impedance value can be extracted for each phase-to-phase and phase-to-ground loop from the current and voltage amplitudes, as when using the circle. The current and voltage amplitudes are determined from the sampled instantaneous values of the secondary currents and voltages in much the same was as described above.

The resistance component of the impedance can be extracted from a value proportional to the effective power and from squares of the sampled instantaneous current values.

In this extraction method, it is assumed that voltage U(t) and current I(t) at time (t) are generally described with the following sine functions:

$$I(t) = \sqrt{2} \cdot \hat{I}\sin(\omega t + \varphi)$$
$$U(t) = \sqrt{2} \cdot \hat{U}\sin(\omega t).$$

In this case, $\hat{I}$ and $\hat{U}$ are the current and voltage amplitudes, $\omega$ the system oscillation frequency, and $\psi$ the phase difference between I(t) and U(t).

The product of current times voltage results in the following equation:

$$I(t) \cdot U(t) = \sqrt{2} \cdot \hat{I}\sin(\omega t + t) \cdot \sqrt{2} \cdot \hat{U}\sin(\omega t).$$

After conversion, the following is obtained:

$I(t) \cdot U(t) = \hat{U}\hat{I} \cos \psi - \hat{U}\hat{I} \cos(2\omega t + \psi)$.

The term on the right of this equation contains a cosine with twice the system oscillation frequency $2\omega$. This means that, after integrating product I(t)×U(t) over period of time $T_{2\omega}$, which corresponds to half a system oscillation period, the cosine values with twice the system oscillation frequency add up to zero. The integration function produces:

$$\int_{T_{2\omega}} U(t) \cdot I(t) dt = \frac{\pi}{\omega} \hat{U}\hat{I}\cos\varphi \tag{1}$$

This integral supplies a value that is proportional to the effective power $P = \hat{U}\hat{I} \cos \psi$ However, effective power P can also be calculated in the usual manner with the following equation:

$P = \hat{I}^2 Z_R$.

In this case, $Z_R$ is the resistance component of impedance. The square of the instantaneous values of current is needed for this calculation. To determine this, the integration of squared instantaneous values of current over time $T_{2\omega}$ is calculated as follows:

$$\int_{T_{2\omega}} I^2(t)dt = 2\hat{I}^2 \int_{T_{2\omega}} \sin^2(\omega t + \varphi)dt \qquad (2)$$

$$= \frac{\pi}{\omega}\hat{I}^2$$

Consequently, resistance component $Z_R$ can be derived from the values of equations (1) and (2).

$$Z_R = \frac{\int_{T_{2\omega}} U(t) \cdot I(t)dt}{\int_{T_{2\omega}} I^2(t)dt}$$

$$= \frac{\hat{U}\hat{I}\cos\varphi}{\hat{I}^2}$$

Taking into account this fundamental relationship, the value proportional to the effective power is first determined in the method according to the present invention, as described below based on the example of phase-to-ground loop L1–E:

$$P_{S1-SE,effect}(t_n) = \sum_{k=0}^{9} U_{S1}(t_{n-k}) \cdot I_{S1}(t_{n-k})$$

In this equation, the value proportional to the effective power for loop L1–E at time tn is on the left. On the right, the product of the instantaneous value of the secondary voltage between conductor 1 and ground times the instantaneous value of the secondary current in conductor 1, both sampled at time $t_{n-k}$, is added over values of k. The total contains all instantaneous values recorded for loop L1–E between $t_{n-9}$ and $t_n$ and corresponds to the integration function over half a system oscillation period after performing ten samplings per half period.

The stored instantaneous values of the secondary current obtained over the same time period $t_{n-9}$ to $t_n$ are then squared and summed up for the same loop L1–E:

$$I^2_{\Sigma,S1}(t_n) = \sum_{k=0}^{9} I^2_{S1}(t_{n-k})$$

Time $t_n$ on the left once again shows that the measured total is a value for extracting the resistance component at time $t_n$. The resistance component of loop impedance is calculated with the following quotients:

$$Z_{R,S1-SE}(t_n) = \frac{P_{S1-SE,effect}(t_n)}{I^2_{\Sigma,S1}(t_n)}$$

The table below contains the rules for forming the values proportional to the effective power and the totals of the secondary current squares for each individual phase-to-phase or phase-to-ground loop:

| Loop | $I_{\Sigma^2,Loop}(t_n) =$ | $P_{loop, effect}(t_n) =$ |
|---|---|---|
| L1-E | $\sum_{k=0}^{9} I^2_{S1}(t_{n-k})$ | $\sum_{k=0}^{9} U_{S1}(t_{n-k}) \cdot I_{S1}(t_{n-k})$ |
| L2-E | $\sum_{k=0}^{9} I^2_{S2}(t_{n-k})$ | $\sum_{k=0}^{9} U_{S2}(t_{n-k}) \cdot I_{S2}(t_{n-k})$ |
| L3-E | $\sum_{k=0}^{9} I^2_{S3}(t_{n-k})$ | $\sum_{k=0}^{9} U_{S3}(t_{n-k}) \cdot I_{S3}(t_{n-k})$ |
| L1-L2 | $\sum_{k=0}^{9} (I_{S1}(t_{n-k}) - I_{S2}(t_{n-k}))^2$ | $\sum_{k=0}^{9} (U_{S1}(t_{n-k}) - U_{S2}(t_{n-k})) \cdot (I_{S1}(t_{n-k}) - I_{S2}(t_{n-k}))$ |
| L2-L3 | $\sum_{k=0}^{9} (I_{S2}(t_{n-k}) - I_{S3}(t_{n-k}))^2$ | $\sum_{k=0}^{9} (U_{S2}(t_{n-k}) - U_{S3}(t_{n-k})) \cdot (I_{S2}(t_{n-k}) - I_{S3}(t_{n-k}))$ |
| L3-L1 | $\sum_{k=0}^{9} (I_{S3}(t_{n-k}) - I_{S1}(t_{n-k}))^2$ | $\sum_{k=0}^{9} (U_{S3}(t_{n-k}) - U_{S1}(t_{n-k})) \cdot (I_{S3}(t_{n-k}) - I_{S1}(t_{n-k}))$ |

The entries in the first column represent the phase-to-phase or phase-to-ground loop. The second column contains the rule for forming sums of the secondary current squares, and the third column shows the rule for forming the value proportional to the effective power.

The impedance values, i.e. the absolute impedance value and the resistance component of impedance, can also be advantageously checked, without having to be explicitly calculated, to see whether they lie within the truncated circle, using a comparison such as the one below:

For the absolute impedance value:

$$\hat{U}^2_{loop} \leq Z^2_{BK} \times \hat{I}^2_{loop}$$

and

For the resistance component $$P_{loop,effect} \leq R_{balance\ point,b\ circle} \times I^2_{\Sigma,loop}$$

The inequality for the absolute impedance value was also used above for checking the absolute impedance value to see whether it lies within a circle. In the present case, using the truncated circle, $Z_{BK}$ corresponds to the radius of the truncated circle.

The left side of the second inequality shows the value proportional to the effective power representing the holding component for the loop. The product on the right is formed from the balance point resistance and the sum of the current amplitude squares and represents the tripping component. The balance point resistance corresponds to the positive resistance value of the intersection on the impedance plane between the truncated circle and the resistance axis (0.8× $R_B$). In a phase-to-ground loop, this balance point resistance must be corrected as follows with a parameterized correction factor:

$$Z_{Balance\ point,LE} = \frac{\sqrt{\left(1 + \frac{X_E}{X_L}\right)\tan(\varphi_L)^2 + \left(1 + \frac{R_E}{R_L}\right)^2}}{\tan^2(\varphi_L) + 1} \cdot R_{Balance\ point,b\ circle}$$

This correction is used to convert a specific positive-phase-sequence system impedance to a loop impedance. The parameters $X_E$, $X_L$, $R_E$, $R_L$ form the system-specific reactance and resistance the for zero-phase-sequence system (E) and positive-phase-sequence system (L), and $\phi_L$ is the phase angle between the positive-phase-sequence impedance and the resistance axis.

The two inequalities must, of course, be satisfied in order to determine that the impedance values lie within the truncated circle.

In the impedance protection method described in this example, a starting block can be provided in which the phase-to-phase and phase-to-ground loops are selected before checking the impedance values to see whether they lie within a circle or a truncated circle, providing that only one loop is activated;

or a phase-to-phase loop and simultaneously a loop between one of the conductors in the phase-to-phase loop and ground were activated;

or all phase-to-phase loops were activated;

or all loops were activated.

Using a polygon, the impedance values of the activated but not selected loops are not checked until later on in the method, unless a tripping signal was already produced, and if a polygon is used.

When using a polygon as the tripping characteristic, the components of the impedance value to be checked are the resistance and inductance. These components are extracted for each loop from the sampled instantaneous values of the secondary currents and voltages. This procedure assumes that the secondary currents and voltages in the loops can be described as follows using a first-order differential equation:

$$U_{Loop}(t_n) = L_{Loop} \frac{d\,I_{Loop}(t_n)}{d\,t} + R_{Loop} \cdot I_{Loop}(t_n)$$

In this equation, $R_{loop}$ and $L_{loop}$ are the two unknown components of the impedance value to be determined. A similar equation using $R_{loop}$ and $L_{loop}$ at a time $t_m$ at which the current and voltage values are linearly independent of the current and voltage values at time $t_n$ is needed in order to determine the components of the impedance value.

In principle, the instantaneous values of the secondary current and the secondary voltage, which were sampled and stored at a time $t_n$, can be inserted into the differential equation. However, the instantaneous values usually contain a serious measurement error, which is propagated when determining the components of the impedance value. For this reason, the secondary current and voltage values to be used must be formed by several consecutive instantaneous values of secondary current and secondary voltage. The patent specification European Patent Application No. 0 284 546 describes the procedure used in this case.

Supplementing the method described in European Patent Application No. 0 284 546 is an explanation of the basic procedure when using the described method in a loop. The differential equation is set up, for example, for loop L1–L2; to do this, $U_{S1}(t_n)$, $I_{S1}(t_n)$ and $\frac{d\,I_{S1}(t_n)}{d\,t}$ in are first determined in conductor 1, after which $U_{S2}(t_n)$, $I_{S2}(t_n)$ and $\frac{d\,I_{S2}(t_n)}{d\,t}$ in are determined in conductor 2. Two corresponding differential equations are then set up and the second one subtracted from the first. The following differential equation is obtained:

$$U_{S1-S2}(t_n) = L_{S1-S2} \frac{d\,I_{S1-S2}(t_n)}{d\,t} + R_{S1-S2} \cdot I_{S1-S2}(t_n).$$

As already mentioned, this equation must also be set up for time $t_m$ in order to determine $L_{S1-S2}$ and $R_{S1-S2}$.

The method described European Patent Application No. 0 284 546 uses linear-phase non-recursive digital filters (FIR filters). Each digital filter has a specific number of coefficients. This number is the same for each filter used and determines the number of instantaneous values used in order to form a current or voltage value. Increasing the number of coefficients decreases the magnitude of the measurement error in the formed current and voltage values. Consequently, the determined impedance values also have a smaller error. The number of coefficients can therefore be higher when using the maximum tripping characteristic, i.e. the largest polygon, than when using a smaller polygon.

In the impedance protection method described as an example, eleven coefficients are used for the digital FIR filters when implementing polygon 7b, while 21 coefficients are used for the digital FIR filters when implementing maximum tripping characteristic 8b.

What is claimed is:

1. An impedance protection method for detecting short-circuits on a monitored section of an electrical power supply line, comprising the steps of:

detecting a current and a voltage of the monitored section;

determining first impedance values as a function of the current and the voltage;

comparing the first impedance values to a first tripping characteristic corresponding to the monitored section;

if the impedance values are within the first tripping characteristic, generating a tripping signal, if the impedance values are outside the first tripping characteristic, switching to a maximum tripping characteristic corresponding to monitored section, the first tripping characteristic being smaller than the maximum tripping characteristic, determining second impedance values after determining the first impedance values;

comparing the second impedance values to the maximum tripping characteristic; and if the second impedance values are within the maximum tripping characteristic, generating the tripping signal.

2. The impedance protection method according to claim 1, further comprising the steps of:

if the first impedance values are outside the first tripping characteristic, switching to a second tripping characteristic, the second tripping characteristic being slightly larger than the first tripping characteristic and smaller than the maximum tripping characteristic;

determining third impedance values after determining the first impedance values;

comparing the third impedance values to the second tripping characteristic;

if the third impedance values are inside the second tripping characteristic, generating the tripping signal;

if the third impedance values are outside the second tripping characteristic, switching to a third tripping characteristic, the third tripping characteristic being larger than the second tripping characteristic and smaller than the maximum tripping characteristic;

determining fourth impedance values after determining third impedance values;

if the fourth impedance values are within the third tripping characteristic, generating the tripping signal; and if the fourth impedance values are outside the fourth tripping characteristic, switching to the maximum tripping characteristic.

3. The impedance protection method according to claim 1, wherein the first tripping characteristic is a circle having a center point, and wherein the center point of the circle is defined by a start point of the monitored section of the electrical power supply line.

4. The impedance protection method according to claim 1, wherein the first tripping characteristic range is a truncated circle having a center point that is symmetrical and parallel to a reactance axis, wherein the center point is defined by a start point of the monitored section of the electrical power supply line, and further comprising the step of:

determining if absolute values and resistance components of the first impedance values are within the first tripping characteristic.

5. The impedance protection method according to claim 2, wherein the second tripping characteristic is a circle having a center point cut symmetrically and parallel to a reactance axis, wherein the center point is defined by a start point of the monitored section of the electrical power supply line, and further comprising the step of:

determining if absolute values and resistance components of the third impedance values are within the second tripping characteristic.

6. The impedance protection method according to claim 4, further comprising the step of:

extracting a resistance component of at least one of the first impedance values, including the steps of:
measuring instantaneous values of the current and the voltage during at least one half of a system oscillation period of the electrical power supply line,
determining instantaneous values of power as a first function of the instantaneous values of the current and the voltage,
determining a value proportional to an effective power as a second function of the instantaneous values of power, the second function including integration,
squaring the instantaneous values of the current,
determining an integral of the squared instantaneous values of the current, and
generating, using quotient formation, the resistance component as a function of the value proportion to the effective power and the integral of the squared instantaneous values of the current.

7. The impedance protection method according to claim 3, wherein the step of determining the first impedance values further comprising the step of:

in a digital filter unit, digitizing and weighing first instantaneous values of individual conductor currents and of a ground current, and second instantaneous values of the voltages between two conductors and between a single conductor and a ground, the digital filter unit including at least one linear-phase non-recursive digital filter of a first type and at least one linear-phase non-recursive digital filter of a second type, wherein the first instantaneous values and the second instantaneous values are weighed by one of the filter of the first type and the filter of the second type to generate a phase rotation, the phase rotation providing an orthogonal relationship between those of the first instantaneous values and the second instantaneous values weighted by the filter of the first type and those of the first instantaneous values and the second instantaneous values weighted by the filter of the second type; and determining the first impedance values as a function of the weighted first instantaneous values and the weighted second instantaneous values, the function including a quotient and including the step of determining real and imaginary components of amplitudes of a current of phase-to-phase loops and phase-to-ground loops and amplitudes of a voltage of phase-to-phase loops and phase-to-ground loops.

8. The impedance protection method according to claim 1, further comprising the steps of:

before the step of comparing the first impedance values to the first tripping characteristic, detecting at least one activated loop, the at least one activated loop being one of:
a first phase-to-ground loop and a first phase-to-phase loop,
the first phase-to-phase loop and, simultaneously, a loop between one of conductors in the first phase-to-phase loop and ground,
all of a plurality of phase-to-phase loops, and
all of a plurality of phase-to-phase loops and
all of a plurality of phase-to-ground loops; and
generating the first impedance values as a function of instantaneous values of the current and the voltage of the at least one activated loop.

9. The impedance protection method according to claim 2, wherein at least one of the third characteristic and the fourth tripping characteristic is a polygonal tripping characteristic.

10. The impedance protection method according to claim 1, wherein the maximum tripping characteristic is a polygonal tripping characteristic.

11. The impedance protection method according to claim 9, further comprising the steps of:

digitizing and weighing instantaneous values of the current and the voltage in a digital filter arrangement, the digital filter arrangement including two linear-phase non-recursive digital filters of a first type and a digital filter of a second type, the instantaneous values being digitized and weighted to compare one of the second and third impedance values with the polygonal tripping characteristic, wherein individual weighting factors of the digital filters are predetermined;

correcting an error produced when the instantaneous values are weighted using a correction factor, the correction factor being formed as a quotient from an amplitude-log frequency curve at a nominal frequency of the digital filters; and determining resistance and inductance components of the first impedance values from the corrected and weighted instantaneous values.

12. The impedance protection method according to claim 11, wherein the two linear-phase non-recursive digital filters have n+1 weighting factors, n being an integer, and wherein, when one of the second impedance values and the third impedance values is compared to the polygonal tripping characteristic, a first value of n is smaller than a second value of n used when comparing the second impedance values to the maximum tripping characteristic.

* * * * *